United States Patent
Rahiman et al.

(10) Patent No.: US 12,363,110 B2
(45) Date of Patent: Jul. 15, 2025

(54) SYSTEMS AND METHODS TO PROVIDE PRE-DEPLOYMENT ASSESSMENT FOR DEVICE INTEGRITY

(71) Applicant: Dell Products, L.P., Round Rock, TX (US)

(72) Inventors: Shinose Abdul Rahiman, Bangalore (IN); Rama Rao Bisa, Bangalore (IN); Dharma Bhushan Ramaiah, Bangalore (IN); Vineeth Radhakrishnan, Palakkad (IN); Mini Thottunkal Thankappan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 234 days.

(21) Appl. No.: 18/179,492

(22) Filed: Mar. 7, 2023

(65) Prior Publication Data
US 2024/0305632 A1   Sep. 12, 2024

(51) Int. Cl.
*H04L 9/40*   (2022.01)
(52) U.S. Cl.
CPC ...... *H04L 63/0869* (2013.01); *H04L 63/0442* (2013.01)
(58) Field of Classification Search
CPC ........................ H04L 63/0869; H04L 63/0442
See application file for complete search history.

(56) References Cited

U.S. PATENT DOCUMENTS

| | | | |
|---|---|---|---|
| 2021/0073003 A1* | 3/2021 | Jacquin | G06F 21/44 |
| 2021/0349836 A1* | 11/2021 | Benedict | G06F 12/1433 |
| 2022/0043914 A1* | 2/2022 | Edwards | G06F 21/32 |

\* cited by examiner

Primary Examiner — Henry Tsang
(74) Attorney, Agent, or Firm — Fogarty LLP

(57) ABSTRACT

According to embodiments of the present disclosure, systems and methods to provide pre-deployment assessment for device integrity are disclosed. The pre-deployment assessment systems and methods include computer-executable instructions to identify a Security Protocol and Data Model (SPDM)-enabled device conforming to a SPDM specification, obtain one or more identifying parameters and one or more critical parameters from the SPDM-enabled device, and communicate with a server to obtain information about the SPDM-enabled device without sending any critical information to the server. The instructions then determine whether the SPDM-enabled device is authorized for use in the IHS by comparing the identifying parameters with the information obtained from the server, and when the SPDM-enabled device is authorized for use with the IHS, send the critical parameters to the server. However, when the SPDM-enabled device is not authorized for use with the IHS, the instructions inhibit sending of the critical parameters to the server.

20 Claims, 3 Drawing Sheets

SYSTEMS AND METHODS TO PROVIDE PRE-DEPLOYMENT ASSESSMENT FOR DEVICE INTEGRITY

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of trust provided thereby.

SUMMARY

According to embodiments of the present disclosure, a system and method to provide pre-deployment assessment for device integrity is disclosed. The pre-deployment assessment system and method includes computer-executable instructions to identify a Security Protocol and Data Model (SPDM)-enabled device conforming to a SPDM specification, obtain one or more identifying parameters and one or more critical parameters from the SPDM-enabled device, and communicate with a server to obtain information about the SPDM-enabled device without sending any critical information to the server. The computer-executable instructions then determine whether the SPDM-enabled device is authorized for use in the IHS by comparing the identifying parameters with the information obtained from the server, and when the SPDM-enabled device is authorized for use with the IHS, send the critical parameters to the server. However, when the SPDM-enabled device is not authorized for use with the IHS, the instructions inhibit sending of the critical parameters to the server.

According to another embodiment, a SPDM-based pre-deployment method includes the steps of identifying a SPDM-enabled device after it has been initially configured in an HIS, and obtaining one or more identifying parameters and one or more critical parameters from the SPDM-enabled device. The method further includes the steps of communicating with a server to obtain information about the SPDM-enabled device, determining whether the SPDM-enabled device is authorized for use in the IHS by comparing the identifying parameters with the information obtained from the server such that when the SPDM-enabled device is authorized for use with the IHS, sending the critical parameters to the server, and when the SPDM-enabled device is not authorized for use with the IHS, inhibiting sending of the critical parameters to the server.

According to yet another embodiment, a computer program product includes computer-executable instructions to, after a SPDM-enabled device has been initially configured in the IHS, identify the SPDM-enabled device, and obtain one or more identifying parameters and one or more critical parameters from the SPDM-enabled device conforming to a SPDM specification. The instructions may be further configured to communicate with a server to obtain information about the SPDM-enabled device, determine whether the SPDM-enabled device is authorized for use in the IHS by comparing the identifying parameters with the information obtained from the server such that, when the SPDM-enabled device is authorized for use with the IHS, send the critical parameters to the server, and when the SPDM-enabled device is not authorized for use with the IHS, inhibit sending of the critical parameters to the server.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
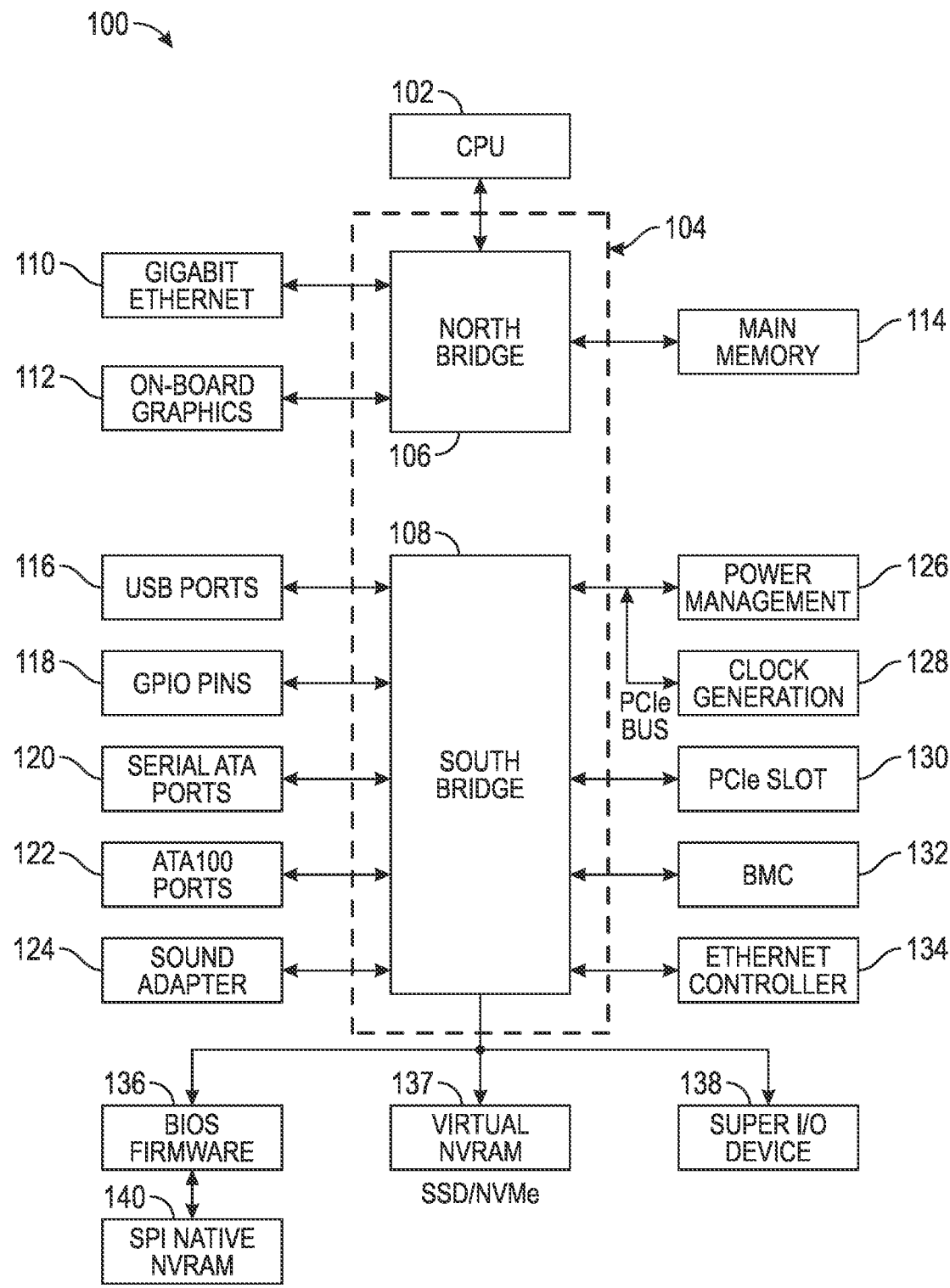
FIG. 1 shows an example of an Information Handling System (IHS) that may be configured to implement a system and method for pre-deployment assessment of SPDM-enabled devices for device integrity using SPDM according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which support peer-to-peer messaging (e.g., route by ID), and allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

Attestation Evidence may be collected from the BMC by external entities to verify the authenticity and integrity of the BMC and its SPDM-enabled devices (e.g., sub-components). In pre-deployment time, such as when an IHS is being assembled by an IHS during its manufacture, a receiving party (e.g., a Secure Zero Touch Provisioning (SZTP) server, etc.) obtains critical information during SPDM attestation. For an adversary, such critical information may include intelligence that can be used against the IHS vendor. As such, it may be beneficial to limit who can receive the attestation information.

The critical parameters from an SPDM device may be collected as part of pre-deployment assessment (e.g., provisioning, bootstrapping, etc.). Preventing adversarial actors from obtaining critical parameters (e.g., attestation information, firmware version, geo location, etc.) may be needed so that intelligence and critical parameters associated with the SPDM-enabled device is not disclosed to the unauthorized parties. As will be described in detail herein below, systems and methods to provide pre-deployment assessment For Device Integrity are provided in which a SPDM-enabled device, which is to be onboarded onto an IHS, is checked using SPDM trust verification techniques to determine whether that SPDM-enabled device is authorized for use in that IHS, and inhibit the sending of the critical parameters when the SPDM-enabled device is not authorized. Additionally, the authenticity of an onboarding server may also be checked to determine if it is authorized to provided onboarding information and receive the critical information prior to sending that onboarding server any critical parameters.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. Managed devices may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM specification also provides a slot mask that identifies each certificate chain.

Figure 2:
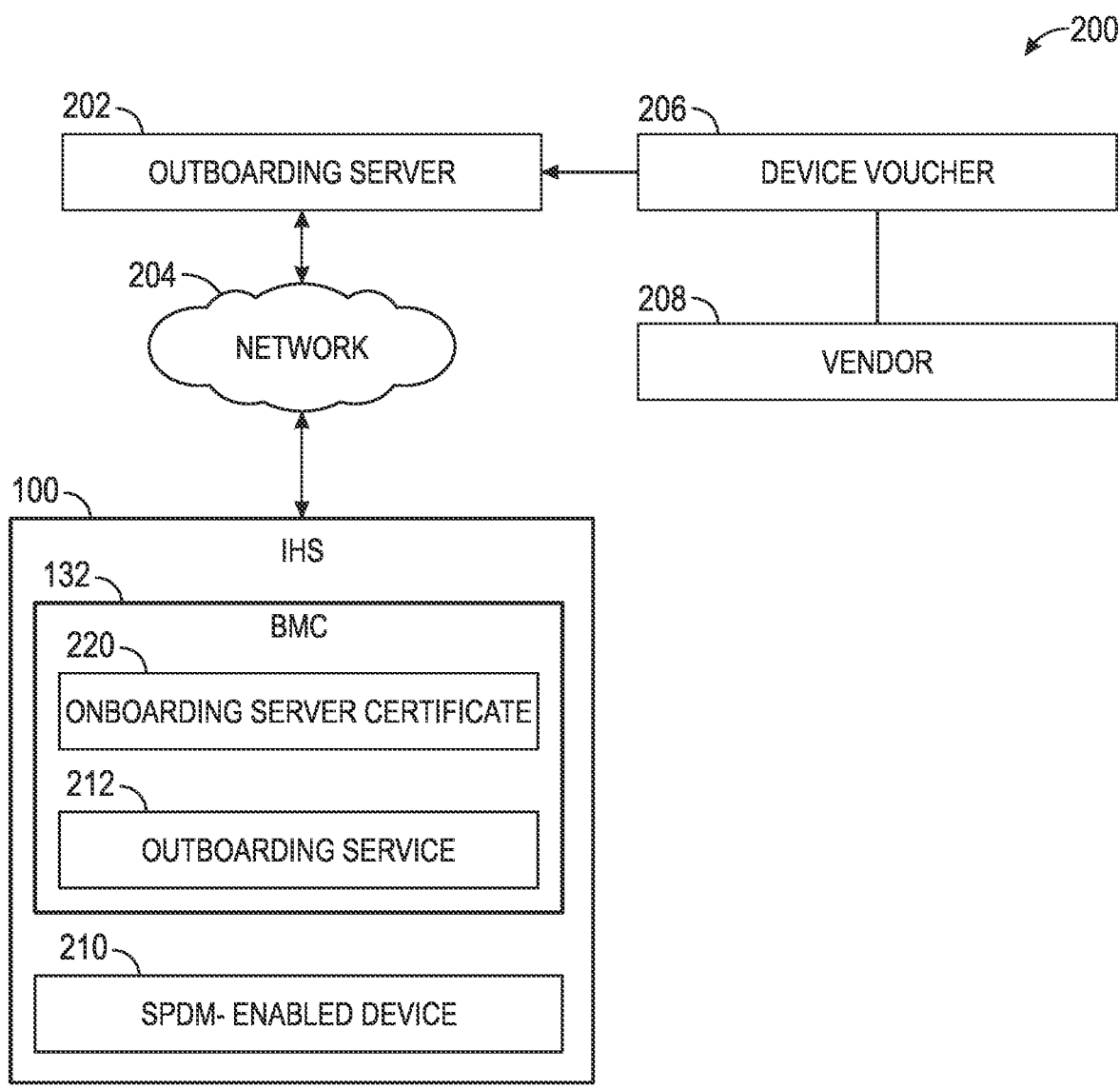
FIG. 2 illustrates an example pre-deployment assessment system that may be used to provide device integrity according to one embodiment of the present disclosure.

FIG. 2 illustrates an example pre-deployment assessment system 200 that may be used to provide device integrity according to one embodiment of the present disclosure. The pre-deployment assessment system 200 includes an onboarding server 202 communicatively coupled to a BMC 132 configured in an IHS 100 over a network 204, which may be any suitable type, such as a local area network (LAN) or a Wide Area Network (WAN) (e.g., the Internet). The onboarding server 202 stores device voucher 206, which is provided by a vendor 208 of the IHS 100 such that, when a SPDM-enabled device 210 is onboarded (e.g., installed) on the IHS 100, an onboarding service 212 executed on the BMC 132 checks using SPDM trust verification techniques, whether the SPDM-enabled device 210 is authorized for use in the IHS 100, and inhibit the sending of the critical parameters obtained from the SPDM-enabled device 210 when it is not authorized. Additionally, the onboarding service 212 checks the authenticity of the onboarding server 202 using SPDM-based trust techniques to determine if the onboarding server 202 is authorized to provided onboarding information and receive the critical information prior to sending that onboarding server any critical parameters.

According to embodiments of the present disclosure, the BMC 132 may support SPDM to manage the operation of one or more SPDM-enabled devices 210 configured in the IHS 100. Examples of such SPDM-enabled devices 210 include on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM specification also provides a slot mask that identifies each certificate chain.

During provisioning of the SPDM-enabled device 210 in the IHS 100 (e.g., when the SPDM-enabled device 210 is initially configured in the IHS 100), identifying information (e.g., device make/model, Serial Number, etc.) as well as critical information (e.g., firmware measurement information, location, firmware version, etc.) is typically provided to the onboarding server 202. The onboarding server 202 may be any entity that facilitates network onboarding, such as a Rendezvous server as used in FDO, or a bootstrap server as used in Secure Zero Touch Provisioning (SZTP). Within this disclosure, the term "initially configured" may refer to a state in which the SPDM-enabled device 210 is physically mounted in the IHS 100 but has not been provisioned for use with the IHS 100.

When the SPDM-enabled device 210 is initially configured in the IHS 100, the BMC 132 may attempt to identify it. Usually, the onboarding SPDM-enabled device 210 is identified either by prior configuration from the factory, or by utilizing a suitable discovery protocol. Using the pre-deployment assessment system 200, the BMC 132 provides critical information to an external entity only after it has established that it is talking to an onboarding entity and that the external entity is trusted. These check may be performed based on trust anchors provisioned in the BMC 132. For example, the BMC 132 may be provisioned with an onboarding server certificate 220 (e.g., onboarding server public identity cert) so that the BMC 132 may mutually authenticate with the onboarding server 202 so that it can be trusted to receive the critical parameters associated with the SPDM-enabled device 210. Additionally, when the SPDM-enabled device 210 is procured or otherwise obtained for the purpose of installation in the IHS 100, the vendor 208 may generate a device voucher 206 and upload the device voucher 206 to the onboarding server 202 so that, when the onboarding service 212 queries the onboarding server 202 for information about the SPDM-enabled device 210 to ensure that the onboarding SPDM-enabled device 210 is what the BMC 132 is expecting to connect to.

The onboarding service 212 may take certain actions based on the pre-deployment findings. For example, the onboarding service 212 may update the firmware in the SPDM-enabled device 210, quarantine the SPDM-enabled device 210 if one or more faults (e.g., SPDM-enabled device firmware in debug mode is enabled, mismatch in the reported geographical location, etc.) is detected.

Figure 3:
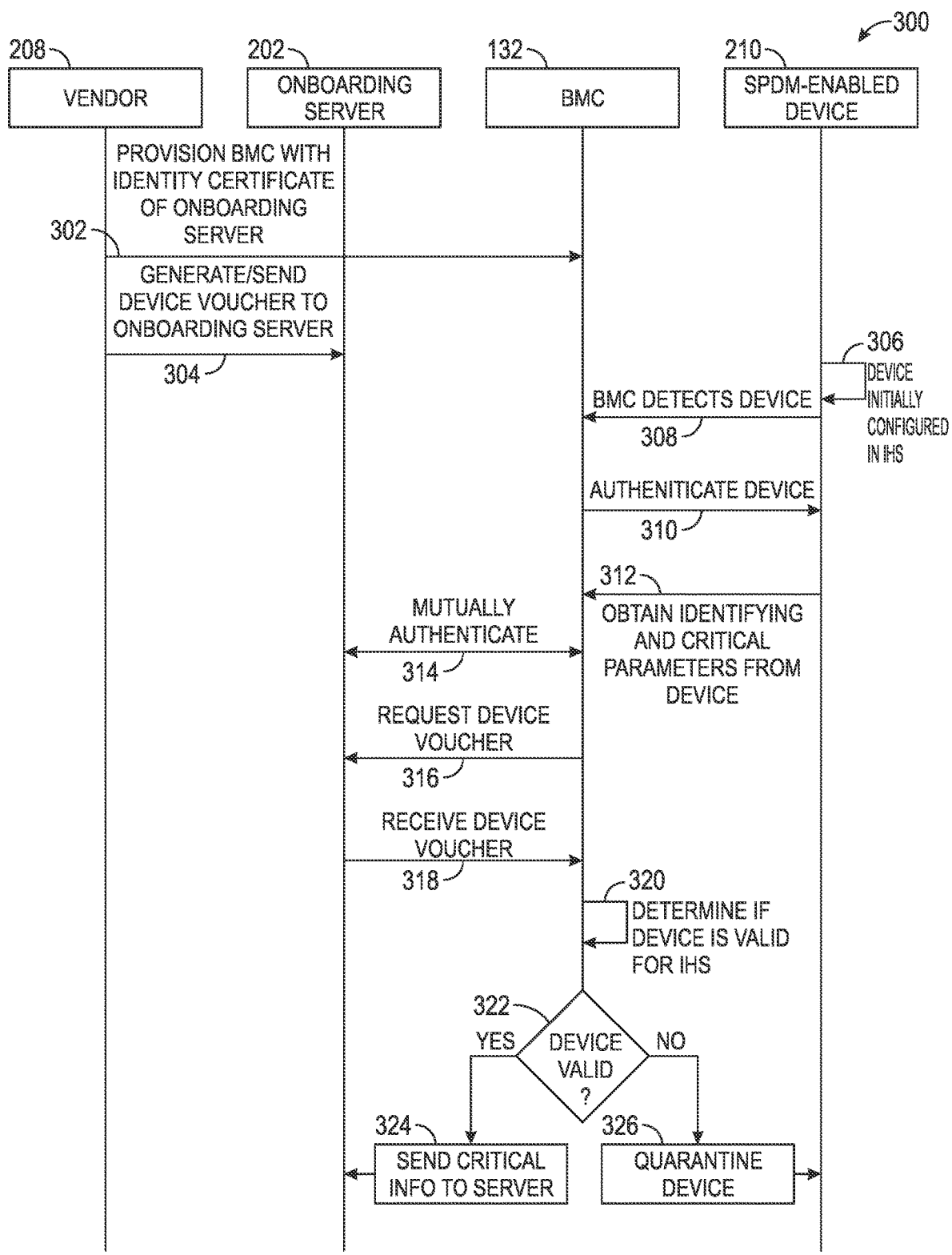
FIG. 3 is a flow diagram illustrating an example pre-deployment assessment method that may be performed to provide device integrity according to one embodiment of the present disclosure.

FIG. 3 is a flow diagram illustrating an example pre-deployment assessment method 300 that may be performed to provide device integrity according to one embodiment of the present disclosure. Additionally or alternatively, the pre-deployment assessment method 300 may be performed at least in part, by the pre-deployment assessment system 200 as described herein above with reference to FIG. 2.

Initially at step 302, the BMC 132 is provisioned with a device identity certificate associated with the onboarding server 202. The BMC 132 may be provisioned with the device identity certificate at any suitable time. In one embodiment, the BMC 132 may be provisioned with the device identity certificate when the BMC 132 is initially turned-up for use; for example, shortly after the BMC 132 is manufactured. At step 304, the vendor 208 procures a SPDM-enabled device 210, generates a device voucher 206 associated with the SPDM-enabled device 210, and uploads the device voucher 206 to the onboarding server 202. The device voucher 206 generally includes information about the SPDM-enabled device 210, such as its device identity (e.g., make/model, serial number, etc.), expected firmware version (s). In one embodiment, the device voucher 206 also includes identity information associated with a particular IHS 100 and/or BMC 132 that the SPDM-enabled device 210 is expected to be configured with.

At step 306, the SPDM-enabled device 210 is initially configured in the IHS 100. For example, the SPDM-enabled device 210 may be inserted into an expansion slot of a PCIe bus configured in the IHS 100 in which, while the SPDM-enabled device 210 is physically coupled to the IHS 100, it has not yet been provisioned for use with the IHS 100. Thereafter at step 308, the BMC 132 detects the presence of the SPDM-enabled device 210. Upon detection of the SPDM-enabled device 210, the BMC 132 authenticates the SPDM-enabled device 210 at step 310, and obtains identifying and critical parameters from the SPDM-enabled device 210 at step 312. It may be important to note that, although the BMC 132 has possession of the critical parameters associated with the SPDM-enabled device 210, it will not send those critical parameters to any existing entity without having previously generated a secure trust relationship with that entity. To that end, the BMC 132 uses the onboarding server certificate 220 stored in its memory to contact the onboarding server 202 and mutually authenticate with the onboarding server 202 at step 314.

Once authenticated, the BMC 132 issues a request for the device voucher 206 associated with the SPDM-enabled device 210 at step 316. For example, the BMC 132 may issue the request using the identifying information it received earlier from the SPDM-enabled device 210 at step 312. Thereafter at step 318, the BMC 132 obtains the device voucher 206 from the onboarding server 202 at step 318, and compares the identifying information it received from the SPDM-enabled device 210 with that included in the device voucher 206 to determine whether the SPDM-enabled device 210 is authorized to be used on the IHS 100 at step 320. At step 322, if the SPDM-enabled device 210 is authorized for use on the IHS 100, processing continues at step 324 in which the BMC 132 sends the critical information associated with the SPDM-enabled device 210 to the onboarding server 202. If, however, the SPDM-enabled device 210 is determined to not be authorized for use with the IHS 100, processing continues at step 326 in which the BMC 132 may quarantine the un-authorized SPDM-enabled device 210. The BMC 132 may quarantine the SPDM-enabled device 210 in any suitable manner. For example, the BMC 132 may generate a pop-up message on a monitor screen that includes information about the un-authorized SPDM-enabled device 210. The BMC 132 may also generate instructions to disable or at least partially disable operation of the IHS 100 associated with the BMC 132 due to the un-authorized SPDM-enabled device 210, or generate instructions for placing the IHS 100 in a failsafe mode of operation, and prompt personnel to investigate the un-authorized SPDM-enabled device 210.

Steps 304-326 may be repeatedly performed for each new SPDM-enabled device 210 that is to be onboarded onto the IHS 100. Nevertheless, when use of the pre-deployment assessment method 300 is no longer needed or desired, the method 300 ends.

Although FIG. 3 describes an example method 300 that may be performed to provide pre-deployment assessments for SPDM-enabled devices to be configured for use in an IHS, the features of the method 300 may be embodied in other specific forms without deviating from the spirit and scope of the present disclosure. For example, the method 300 may perform additional, fewer, or different operations than those described in the present examples. For another example, the method 300 may be performed in a sequence of steps different from that described above. As yet another example, certain steps of the method 300 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a Security Protocol and Data Model (SPDM)-enabled device conforming to a SPDM specification; and
at least one memory coupled to at least one processor, the at least one memory having program instructions stored thereon that, upon execution by the at least one processor, cause the IHS to:
after the SPDM-enabled device has been initially configured in the IHS, identify the SPDM-enabled device;
obtain one or more identifying parameters and one or more critical parameters from the SPDM-enabled device;
communicate with a server to obtain information about the SPDM-enabled device;
determine whether the SPDM-enabled device is authorized for use in the IHS by comparing the identifying parameters with the information obtained from the server;
when the SPDM-enabled device is authorized for use with the IHS, send the critical parameters to the server; and
when the SPDM-enabled device is not authorized for use with the IHS, inhibit sending of the critical parameters to the server.

2. The IHS of claim 1, wherein the program instructions are performed by a Baseboard Management Controller (BMC) configured in the IHS.

3. The IHS of claim 2, wherein the program instructions, upon execution, further cause IHS to, prior to communicating with the server, mutually authenticate the server using a trust anchor provisioned in the BMC.

4. The IHS of claim 3, wherein the trust anchor comprises a public identity key of the server.

5. The IHS of claim 1, wherein the program instructions, upon execution, further cause IHS to:
when the SPDM-enabled device is authorized for use with the IHS, provision the SPDM-enabled device for use in the IHS; and
when the SPDM-enabled device is not authorized for use with the IHS, disable the SPDM-enabled device from being used in the IHS.

6. The IHS of claim 1, wherein the program instructions, upon execution, further cause IHS to identify the SPDM-enabled device according to a prior configuration from a factory where the IHS is manufactured, or by utilizing a discovery protocol.

7. The IHS of claim 1, wherein the program instructions, upon execution, further cause IHS to, prior to obtaining the identifying parameters and the critical parameters from the SPDM-enabled device, authenticate the SPDM-enabled device.

8. The IHS of claim 1, wherein the critical parameters comprise at least one of firmware measurement information, geographical location, and a firmware version.

9. A SPDM-based pre-deployment method comprising:
identifying a Security Protocol and Data Model (SPDM)-enabled device conforming to a SPDM specification after the SPDM-enabled device has been initially configured in an Information Handling System (HIS);
obtaining one or more identifying parameters and one or more critical parameters from the SPDM-enabled device;
communicating with a server to obtain information about the SPDM-enabled device;
determining whether the SPDM-enabled device is authorized for use in the IHS by comparing the identifying parameters with the information obtained from the server;
when the SPDM-enabled device is authorized for use with the IHS, sending the critical parameters to the server; and
when the SPDM-enabled device is not authorized for use with the IHS, inhibiting sending of the critical parameters to the server.

10. The SPDM-based pre-deployment method of claim 9, further comprising performing the SPDM-based pre-deployment method using a Baseboard Management Controller (BMC) configured in the IHS.

11. The SPDM-based pre-deployment method of claim 10, further comprising, prior to communicating with the server, mutually authenticating the server using a trust anchor provisioned in the BMC.

12. The SPDM-based pre-deployment method of claim 11, wherein the trust anchor comprises a public identity key of the server.

13. The SPDM-based pre-deployment method of claim 9, further comprising:
when the SPDM-enabled device is authorized for use with the IHS, provisioning the SPDM-enabled device for use in the IHS; and
when the SPDM-enabled device is not authorized for use with the IHS, disabling the SPDM-enabled device from being used in the IHS.

14. The SPDM-based pre-deployment method of claim 9, further comprising identifying the SPDM-enabled device according to a prior configuration from a factory where the IHS is manufactured, or by utilizing a discovery protocol.

15. The SPDM-based pre-deployment method of claim 9, further comprising, prior to obtaining the identifying parameters and the critical parameters from the SPDM-enabled device, authenticating the SPDM-enabled device.

16. A non-transitory computer readable storage medium having program instructions stored thereon that, upon execution by an Information Handling System (IHS), cause the IHS to:
after a Security Protocol and Data Model (SPDM)-enabled device has been initially configured in the IHS, identify the SPDM-enabled device;
obtain one or more identifying parameters and one or more critical parameters from the SPDM-enabled device conforming to a SPDM specification;
communicate with a server to obtain information about the SPDM-enabled device;
determine whether the SPDM-enabled device is authorized for use in the IHS by comparing the identifying parameters with the information obtained from the server;
when the SPDM-enabled device is authorized for use with the IHS, send the critical parameters to the server; and
when the SPDM-enabled device is not authorized for use with the IHS, inhibit sending of the critical parameters to the server.

17. The non-transitory computer readable storage medium of claim 16, wherein the instructions, upon execution, further cause IHS to, prior to communicating with the server, mutually authenticate the server using a trust anchor provisioned in a Baseboard Management Controller (BMC).

18. The non-transitory computer readable storage medium of claim 16, wherein the instructions, upon execution, further cause IHS to:
when the SPDM-enabled device is authorized for use with the IHS, provision the SPDM-enabled device for use in the IHS; and
when the SPDM-enabled device is not authorized for use with the IHS, disable the SPDM-enabled device from being used in the IHS.

19. The non-transitory computer readable storage medium of claim 16, wherein the instructions, upon execution, further cause IHS to identify the SPDM-enabled device according to a prior configuration from a factory where the IHS is manufactured, or by utilizing a discovery protocol.

20. The non-transitory computer readable storage medium of claim 16, wherein the instructions, upon execution, further cause IHS to, prior to obtaining the identifying parameters and the critical parameters from the SPDM-enabled device, authenticate the SPDM-enabled device.

* * * * *